US008794672B2

United States Patent
Dramlitsch

(10) Patent No.: US 8,794,672 B2
(45) Date of Patent: Aug. 5, 2014

(54) METHOD FOR DOWNSIZING A SAFETY DEVICE FOR A MOTOR VEHICLE

(75) Inventor: Thomas Dramlitsch, Berlin (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 13/638,971

(22) PCT Filed: Apr. 4, 2011

(86) PCT No.: PCT/EP2011/055169
§ 371 (c)(1),
(2), (4) Date: Dec. 21, 2012

(87) PCT Pub. No.: WO2011/124541
PCT Pub. Date: Oct. 13, 2011

(65) Prior Publication Data
US 2013/0092778 A1    Apr. 18, 2013

(30) Foreign Application Priority Data
Apr. 9, 2010    (JP) .................... 2010-089924

(51) Int. Cl.
*B60R 22/28*    (2006.01)
(52) U.S. Cl.
USPC ........... 280/805; 280/806; 297/470; 297/478
(58) Field of Classification Search
USPC .................. 280/730.2, 739, 743.2, 805, 806; 297/470, 478
See application file for complete search history.

(56) References Cited

U.S. PATENT DOCUMENTS

| | | | | |
|---|---|---|---|---|
| 3,439,932 A * | 4/1969 | Palmieri et al. | ................ | 297/479 |
| 4,187,925 A * | 2/1980 | Lindblad | ........................ | 180/268 |
| 5,374,110 A * | 12/1994 | Hiramatsu | .................... | 297/480 |
| 6,155,976 A * | 12/2000 | Sackner et al. | ................ | 600/300 |
| 7,290,730 B2 * | 11/2007 | Nagata et al. | .................. | 242/374 |
| 7,823,923 B2 | 11/2010 | Dramlitsch | | |
| 2001/0030255 A1 * | 10/2001 | Peter | ............................. | 242/383 |
| 2002/0030357 A1 * | 3/2002 | Midorikawa et al. | .......... | 280/806 |

(Continued)

FOREIGN PATENT DOCUMENTS

| | | |
|---|---|---|
| DE | 10 2007 060 268 | 6/2009 |
| EP | 1 867 534 | 12/2007 |

(Continued)

OTHER PUBLICATIONS

Machine translation of FR 2130814.*
International Search Report and Written Opinion of the International Searching Authority of Oct. 12, 2011.
Japanese Examination Report of Feb. 21, 2012.

*Primary Examiner* — Paul N Dickson
*Assistant Examiner* — Barry Gooden, Jr.
(74) *Attorney, Agent, or Firm* — Gerald E. Hespos; Michael J. Porco; Matthew T. Hespos

(57) ABSTRACT

A method of downscaling the travel-time-function of a reference body of mass $m_r$ in a spring-mass system with a spring providing a spring force when the spring-mass system is exposed to an acceleration field with an acceleration which moves the reference body against the spring force according to the travel-time-function is provided. In this method, the downscaling is done by coupling the reference body of mass $m_r$ to additional masses $m_r$ which are kinematically linked together in such a way that they do not react to acceleration field.

16 Claims, 1 Drawing Sheet

(56) References Cited

U.S. PATENT DOCUMENTS

| | | |
|---|---|---|
| 2003/0030264 A1 | 2/2003 | Motozawa |
| 2004/0075008 A1* | 4/2004 | Mori et al. ............... 242/390.8 |
| 2004/0108155 A1* | 6/2004 | Mori et al. ............... 180/268 |
| 2006/0097505 A1* | 5/2006 | Midorikawa ............... 280/806 |

FOREIGN PATENT DOCUMENTS

| | | |
|---|---|---|
| EP | 1 778 527 | 5/2009 |
| FR | 2 070 544 | 9/1971 |
| FR | 2 130 814 | 11/1972 |
| JP | 2003-25955 | 1/2003 |

\* cited by examiner

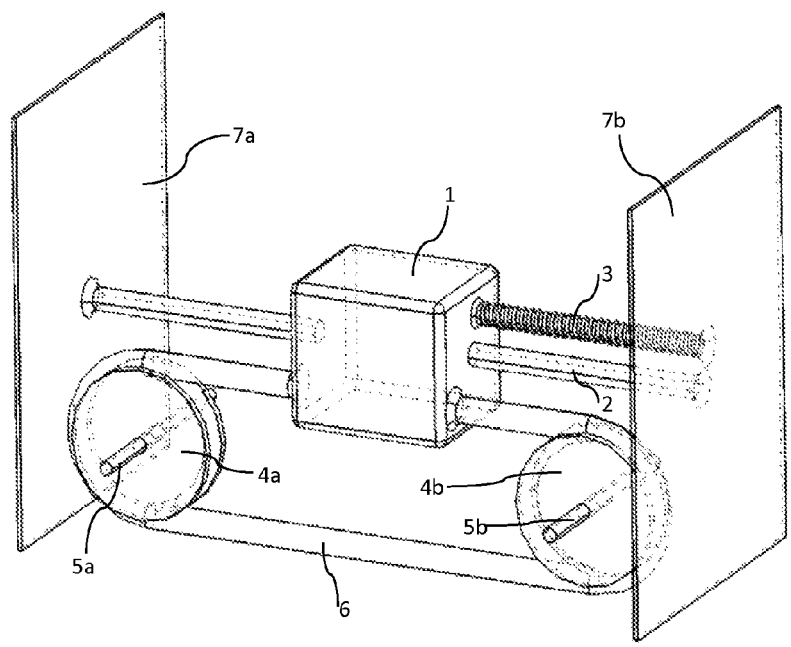

METHOD FOR DOWNSIZING A SAFETY DEVICE FOR A MOTOR VEHICLE

BACKGROUND OF THE INVENTION

1. Field of the Invention

Modern passenger cars are equipped with various active and passive safety devices. Active safety devices are designed to prevent accidents, whereas passive safety devices, like seat belts and air bags are present to mitigate the effects of an accident on the occupant.

2. Description of the Related Art

This invention relates to seat belts, especially to their behaviour in frontal crashes. When a frontal crash occurs, the occupant tends to move forward within the occupant's cell and to hit the steering wheel or dash board or other hard parts of the car's interior. The reason for this tendency of the occupant to move forward is the vehicle's high deceleration, which is characteristic for a frontal crash.

The main purpose of a seat belt system is to prevent the aforementioned forward motion of the occupant. Moreover, in an early stage of the crash, most seat belt systems activate so-called pyrotechnic belt pre-tensioners to increase the force by which the seat belt restrains the occupant.

Once the vehicle's deceleration gets too severe, the seat belt itself may cause harm to the occupant, since the belt's force that acts on the occupant becomes too high (causing rib fractions or similar injuries). In order to prevent such injuries, modern seat belt systems provide a certain controlled belt pull-out. This reduces/limits the belt force and thus the occupant's injury risk.

An advanced method to provide this belt pull-out during an accident is described in EP 1 778 527 B1, where belt pull-out is provided in sole dependency of the vehicle's deceleration (as opposed to most seat belt systems, where belt pull-out is provided in dependence of the belt force in the first place). The advantage of the former method is due to the fact that the seat belt's protective effect does not depend on the occupant's weight (or to be more exact: on the occupant's mass).

A mechanical realization of the method described in EP 1 778 527 B1 can be achieved by a spring-mass-system, fixed to the occupant cell that emulates the crash behaviour (i.e. the kinematics) of an optimally restrained occupant. These kinematics of the so-called reference mass (or reference body) are then transferred to a release and blocking device, which again transfers the motion to the seat belt, which finally transfers the motion to the occupant. By use of this, for example, a constant deceleration of the occupant's thorax may be achieved.

The term 'spring' used here subsumes springs with all kinds of force-travel-characteristics (progressive, digressive, constant etc.). Also, the terms acceleration and deceleration shall here refer to the same physical variable, regardless of its algebraic sign.

Typically, the driver's thorax can move approximately up to 300 mm forward before hitting the steering wheel or instrument panel. An optimal occupant restraint system should take full advantage of this given space for the occupant's forward displacement. This means that the above-mentioned reference body should be able to travel at least the same way relative to the car's occupant cell. This again means that the seat belt system already described, installed in a seat belt retractor in the car's B-pillar needs at least 300 mm of installation space within the car's longitudinal direction, maybe even more. Such an amount of space is, however, typically not available where the seat belt retractor is installed. It would therefore be advantageous to reduce the travelling space of the reference body and to use a transmission to compensate for the reduction of displacement of the reference body in the actual belt pull-out.

It is known that a transmission can be used to change the ratio between the displacement of the reference body and the actual belt pull-out in order to compensate for the seat belt geometry (this is due to the fact that a typical seat belt geometry does not automatically ensure a 1:1 translation of belt pull-out to the occupant's thorax; typically the ratio is closer to 1:1.5). A transmission can, however, only compensate for a constant ratio between the travel-time-function of the reference body and the travel-time-function of belt pull-out. Hence the travel-time-function of the belt pull-out that results from the travel-time-function of the reference body shows the same characteristics as the travel-time-function of the reference body, except for a constant transmission ratio.

The travel-time-function of belt pull-out is an important characteristic in an occupant restraint system which must meet certain requirements. Hence, when the travelling space of the reference body is scaled down, the characteristics of travel-time-function of the belt pull-out should not be altered, except for a constant scaling factor, which can be compensated for by a transmission. Keeping on the one hand certain characteristics of the travel-time-function of the belt pull-out while, on the other hand, downscaling the necessary travelling space of the reference mass means that the downscaling of the necessary travelling space should not alter the characteristics of the travel-time-function of the reference body, except for a constant scaling factor.

However, it is not trivial to achieve a travel-time-function of the reference body for a given vehicle deceleration which differs from the original travel-time-function by a constant scaling factor only. In other words, if for a given vehicle deceleration a(t), where t is the time, the travel distance of the reference body results in a function s(t), a method is now needed to achieve a new travel distance $s_{new}(t)$ where $X \cdot s_{new}(t) = s(t)$ and X is a constant scaling factor.

Accordingly, it is a first object of the present invention to provide a method of downscaling the travel-time-function of a reference body which allows for a reduced travel space of the reference body in a spring-mass-system of a vehicle occupant restraint system.

It is a second object of the invention to provide a method of establishing belt pull-out with a specified travel-time-function in a vehicle occupant restraint system by using a reference body in a spring-mass-system, which method allows for a reduced travel space of the reference body.

It is a third object of the invention to provide a spring-mass device with a spring and a movable reference body which allows for a reduced travel space for the reference body.

It is a fourth object of the invention to provide an occupant restraint system comprising a spring-mass device with a spring and a movable reference body which allows for a reduced travel space for the reference body.

SUMMARY OF THE INVENTION

In accordance with a first aspect of the present invention, a method of downscaling the travel-time-function of a reference body of mass $m_r$ in a spring-mass system with a spring providing a spring force when the spring-mass system is exposed to an acceleration field with an acceleration which moves the reference body against the spring force yielding the aforementioned travel-time-function is provided. In this method, the downscaling is done by coupling the reference body of mass $m_r$ to additional masses $m_r$, which are kinematically linked together in such a way that they do not react to acceleration field. The additional masses $m_r$ may be rotating masses having rotational inertias, e.g., gearwheels or flywheels. In particular, the additional masses $m_r$ may be larger than the mass $m_t$ of the reference body. In case of flywheels as additional masses, the radius at which the reference body acts on the flywheels is preferably smaller than the radius of the flywheels in order to increase their effective rotational mass $m_r$. A transmission may be used between the reference body and the flywheel or gearwheel, preferably a transmission which has a transmission ratio of >2.

In accordance with a second aspect of the present invention, a method of establishing belt pull-out with a specified travel-time-function in a vehicle occupant restraint system during an accident exposing the vehicle to an acceleration field is provided. The occupant restraint system comprises a seat belt, a spring-mass system with a reference body of mass $m_t$ which is exposed to the acceleration field and which can be moved against the spring force by an acceleration of the acceleration field, and a blocking and releasing device for blocking and releasing belt pull-out of the seat belt. The travel-time-function of the reference body, when moving against the spring force, mechanically establishes the travel-time-function of the belt pull-out via the blocking and releasing device of the occupant restraint system. When establishing the belt pull-out with the specified travel-time-function, the travel-time-function of the reference body is scaled down according to the above method of downscaling the travel-time-function. In the method according to the second aspect of the present invention, a transmission may be used between the motion of the reference body and the actual belt pull-out. This transmission may increase the travel-time-function of the belt pull-out resulting from the travel-time-function of the reference mass at least by a factor of $(m_t+m_r)/m_t$, in particular at least by a factor of $1.5 \cdot (m_t+m_r)/m_t$.

In accordance with a third aspect of the present invention, a spring-mass device comprising a spring with a defined spring force and a reference body of mass $m_t$ movable against the spring force in an acceleration field is provided. The spring-mass device according to the third aspect of the invention comprises additional masses $m_r$ which are kinematically linked together in such a way that they do not react to acceleration field and which are coupled to the reference body of mass $m_t$. The masses $m_r$ of the additional masses are preferably larger than the mass $m_t$ of the reference body. The additional masses $m_r$ may be provided by rotating masses having rotational inertias. For example, the additional masses may be provided in form of gearwheels or flywheels. In case of flywheels, the flywheels may be coupled to the reference mass by a band, a belt or a chain wrapped around the flywheels and connected to the reference mass. The band, belt or chain is preferably connected to opposite sides the reference mass. The radius at which the reference body is coupled to the flywheels may be smaller than the radius of the flywheels. A transmission may be present between the reference body and the flywheels or gearwheels, preferably with a transmission ratio of >2.

In accordance with a fourth aspect of the present invention, a vehicle occupant restraint system is provided. The vehicle occupant restraint system comprises:
  a seat belt which provides, in an accident, a belt pull-out according to a specified travel-time-function of the belt pull-out;
  a spring-mass device with a spring providing a defined spring force and a reference body of mass $m_t$; which can move against the spring force in an acceleration field and such results in a travel-time-function of the reference body; and
  a blocking and releasing device for blocking and releasing belt pull-out of the seat belt.

The spring-mass system is linked to the blocking and releasing device so as to mechanically establish the travel-time-function of the belt pull-out via the blocking and releasing device of the occupant restraint system from the travel-time-function of the reference body.

The spring-mass device is a spring-mass device in accordance with the third aspect of the invention.

A transmission may be present between the spring-mass device and the blocking and releasing device. The transmission may increase the travel-time-function of the belt pull-out resulting from the travel-time-function of the reference mass at least by a factor of $(m_t+m_r)/m_t$, preferably at least by a factor of $1.5 \cdot (m_t+m_r)/m_t$.

BRIEF DESCRIPTION OF THE DRAWINGS

FIG. 1 shows an embodiment of the spring-mass device.

DETAILED DESCRIPTION OF THE PREFERRED EMBODIMENT(S)

The purpose of this invention is to provide a method of reducing the travel space needed for a (reference-) spring-mass-system that is used to establish belt pull-out within a seat belt retractor without affecting the functionality of the restraint system. This means in particular that the functional relation between the vehicle's deceleration and belt pull-out may remain unchanged by this invention (equal decelerations result in equal belt pull-outs).

An embodiment of the spring-mass device will now be described with reference to the FIGURE. A reference body (1) of known mass is attached to a sliding bar (2) which again is fixed to the car's interior, e.g. the B-pillar (7a and 7b). The reference body may move freely across the sliding bar but it is restrained by the spring (3) of known characteristics. The reference body is furthermore coupled via a band (6) to two flywheels (4a and 4b) whose axes (5a and 5b) are fixed to the interior of the car (not shown in the drawing). When the reference body, driven by the vehicle's deceleration due to an accident, travels across the sliding bar it forces the flywheels to rotate around their axes. In comparison with the motion of the reference body without rotational masses, its travel-time-relationship scales down by the factor of $$X = \frac{m_t + m_r}{m_t}$$

as described above where
$m_t$ represents the mass of the reference mass
$m_r$ represents the effective rotational mass of the flywheels (additional mass) and
X represents a constant scaling factor Although the axes of the flywheels (4a and 4b) are fixed in the present embodiment, they may rotate freely in alternative embodiments.

According to this invention, the method of reducing the travel space of the reference body works as follows:
The motion of the reference body is downscaled by adding rotational masses to the reference body according to the invention. Furthermore, the belt pull-out may be rescaled using a transmission, in order to maintain the system's behaviour. The transmission ratio then depends on the ratio between the reference body mass and the rotational masses.

The term "transmission" shall here refer to any device that scales a motion by a constant factor. A typical example for this kind of device is a gear transmission where the transmission ratio is given by the ratio of the gears' radii. But quite generally, the term transmission as used here may also refer to any manner of transference, transferral or conveyance as well.

The present invention regards all movable masses that are kinematically linked together and (in sum) do not answer to the vehicle's change of velocity as "rotational masses", but preferably these masses may be realized by masses rotating around a given axis (having rotational inertias).

Example

For a given vehicle's deceleration a(t) (where t stands for the time) without scaling the travel-time-function of the reference body down let the belt pull-out result in a travel-time-function of the reference body of $s_r(t)$ and thus in a belt pull-out $s_b(t)$ with $s_b(t)=s_r(t)$. Let the mass of the reference body be 0.2 kg. If, according to the invention, one adds another 0.2 kg of rotational masses to the reference body for scaling the travel-time-function of the reference body down, the travel-time-function of the reference body automatically reduces to $$\frac{1}{2} s_r(t)$$

(assuming the presence of the same vehicle's deceleration). The exact calculation of this factor is known to a person skilled in the art and will, therefore, not be described here. If one increases the ratio of the transmission (if already present) by a factor of 2 (or alternatively install a new transmission with a transmission ratio of 2), the belt pull-out will remain to be the same function $s_b(t)$ as before, as required. The reference body now travels half the way as it did previously, but the belt pull-out remains the same. The sole condition for these additional masses is that their movement is not coupled directly to the vehicle's deceleration but only to the motion of the reference body itself.

In general, the factor X by which the transmission ratio has to be increased must be chosen as follows: if mt is the (translational) mass of the reference body and mr is the rotational mass of the additional masses the factor X has to be chosen to be $$X := \frac{m_t + m_r}{m_t}$$

in order to achieve the same belt pull-out as if the rotational masses $m_r$ were zero.

Thus, an arbitrary downscaling of the movement of the reference body may be achieved by suitably choosing the rotational mass $m_r$ of the additional masses.

Typically, the rotational masses may be realized as gearwheels or flywheels, or any kind of wheel. It is worthwhile to mention that the rotational mass e.g. of a flywheel is not identical to its mass as measured by a balance. Instead, the effective rotational mass $m_r$ e.g. of a flywheel is given as $m_r=J/(r^2)$ where J is its moment of inertia (rotational inertia) and r the radius at which the reference body acts on the flywheel. By choosing a small r it is possible to get high rotational masses $m_r$ without unnecessarily increasing the weight of the whole system. Alternatively, another transmission between the reference body and the flywheel may be used.

The method described can be used to downscale any motion of a body in a force field.

The invention claimed is:

1. Method of establishing belt pull-out with a specified travel-time-function in a vehicle occupant restraint system during an accident exposing a vehicle to an acceleration field, in which the vehicle occupant restraint system comprises a seat belt, a spring-mass system with a reference body of mass $m_t$ which is exposed to the acceleration field and which can be moved against a spring force by an acceleration of the acceleration field, and a blocking and releasing device for blocking and releasing the belt pull-out of the seat belt, wherein a travel-time-function of the reference body when moving against the spring force mechanically establishes a travel-time-function of the belt pull-out via the blocking and releasing device of the vehicle occupant restraint system, characterized in that, when establishing the belt pull-out with the specified travel-time-function, the travel-time-function of the reference body is scaled down by downscaling the travel-time-function of the reference body of mass $m_t$ in the spring-mass system with a spring providing the spring force when the spring-mass system is exposed to the acceleration field with the acceleration which moves the reference body against the spring force yielding the travel-time-function, wherein the downscaling is done by coupling the reference body of mass $m_t$ to additional masses $m_r$ which are kinematically linked together in such a way that the additional masses $m_r$ do not react to the acceleration field.

2. Method according to claim 1, characterized in that the additional masses $m_r$ are rotating masses having rotational inertias.

3. Method according to claim 2, characterized in that the mass $m_t$ of the reference body is smaller than the additional masses $m_r$.

4. Method according to claim 1, characterized in that a transmission is used between a motion of the reference body and the belt pull-out.

5. Method according to claim 4, characterized in that a transmission increases the travel-time-function of the belt pull-out resulting from the travel-time-function of the reference mass at least by a factor of $(m_t+m_r)/m_t$.

6. Vehicle occupant restraint system, comprising:
a seat belt which provides, in an accident, a belt pull-out according to a specified travel-time-function of the belt pull-out;
a spring mass device with a spring providing a defined spring force and a reference body $m_t$ which can move against the spring force in an acceleration field yielding a travel-time-function of the reference body; and
a blocking and releasing device for blocking and releasing the belt pull-out of the seat belt, wherein
the spring-mass device is linked to the blocking and releasing device so as to mechanically establish the travel-time-function of the reference body, characterized in that the spring mass device comprises additional masses $m_r$ which are kinematically linked together in such a way that the additional masses do not react to the acceleration field and which are coupled to the reference body of mass $m_t$.

7. Vehicle occupant restraint system according to claim 6, characterized in that the additional masses $m_r$ are rotating masses having rotational inertias.

8. Vehicle occupant restraint system according to claim 7, characterized in that the mass $m_t$ of the reference body is smaller than the additional masses $m_r$.

9. Vehicle occupant restraint system according to claim 6, characterized by a transmission between the spring-mass device and the belt pull-out.

10. Vehicle occupant restraint system according to claim 9, characterized in that that the transmission increases the travel-time-function of the belt pull-out resulting from the travel-time-function of the reference mass at least by a factor of $(m_t+m_r)/m_t$.

11. Vehicle occupant restraint system according to claim 6, characterized in that the additional masses $m_r$ are provided in form of gearwheels.

12. Vehicle occupant restraint system according to claim 6, characterized in that the additional masses $m_r$, are provided in form of flywheels.

13. Vehicle occupant restraint system according to claim 12, characterized in that the flywheels are coupled to the reference body by a band, a belt or a chain wrapped around the flywheels and connected to the reference mass.

14. Vehicle occupant restraint system according to claim 12, characterized in that a radius at which the reference body is coupled to the flywheels is smaller than the radius of the flywheels.

15. Vehicle occupant restraint system according to claim 12, characterized in a transmission between the reference body and the flywheels.

16. Vehicle occupant restraint system according to claim 15, characterized in that the transmission has a transmission ratio of greater than 2.

\* \* \* \* \*